United States Patent
Satodate

(10) Patent No.: US 8,379,116 B2
(45) Date of Patent: Feb. 19, 2013

(54) IMAGE PICK-UP APPARATUS AND IMAGE PROCESSING METHOD

(75) Inventor: Yoshihiro Satodate, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 371 days.

(21) Appl. No.: 12/839,470

(22) Filed: Jul. 20, 2010

(65) Prior Publication Data

US 2011/0019035 A1 Jan. 27, 2011

(30) Foreign Application Priority Data

Jul. 21, 2009 (JP) ............................. P2009-170565

(51) Int. Cl.
*H04N 5/217* (2011.01)
*H04N 9/64* (2006.01)

(52) U.S. Cl. ........................................ 348/241; 348/243

(58) Field of Classification Search .................. 348/241, 348/277, 243
See application file for complete search history.

(56) References Cited

U.S. PATENT DOCUMENTS

| | | | |
|---|---|---|---|
| 7,009,639 B1 | 3/2006 | Une et al. | |
| 8,013,914 B2 * | 9/2011 | Egawa | 348/241 |
| 8,063,948 B2 * | 11/2011 | Oizumi | 348/223.1 |
| 8,259,202 B2 * | 9/2012 | Tsukioka | 348/273 |
| 2006/0238629 A1 | 10/2006 | Sato et al. | |
| 2007/0085917 A1 | 4/2007 | Kobayashi | |
| 2007/0146511 A1 | 6/2007 | Kinoshita et al. | |
| 2007/0269133 A1 | 11/2007 | Ooishi | |
| 2008/0193019 A1 * | 8/2008 | Tsuruoka | 382/195 |

FOREIGN PATENT DOCUMENTS

| | | |
|---|---|---|
| JP | 11-191889 A | 7/1999 |
| JP | 2000-341700 A | 12/2000 |
| JP | 2006-304231 A | 11/2006 |
| JP | 2007-110486 A | 4/2007 |
| JP | 2007-142697 A | 6/2007 |
| JP | 2007-312076 A | 11/2007 |

OTHER PUBLICATIONS

Japanese Office Action dated Dec. 5, 2012, with partial English translation.

* cited by examiner

*Primary Examiner* — Jason Chan
*Assistant Examiner* — Gary C Vieaux
(74) *Attorney, Agent, or Firm* — McGinn IP Law Group, PLLC

(57) ABSTRACT

An image pick-up apparatus includes an image pick-up device, a noise reduction processing portion, and a level difference correction portion. The image pick-up device includes at least three kinds of color filters and photoelectric conversion elements formed under the color filters respectively. The noise reduction processing portion applies noise reduction processing to image pick-up signals output from the image pick-up device. The level difference correction portion executes correction to reduce a level difference between first and second ones of the noise reduction-processed image pick-up signals obtained from the photoelectric conversion elements formed under two color filters which are of the same kind but different in arrangement pattern of color filters arranged around the two color filters. The level difference correction portion changes correction strength in accordance with strength of noise reduction processing executed by the noise reduction processing portion.

22 Claims, 10 Drawing Sheets

FIG. 5

| ISO SENSITIVITY (GAIN) | NOISE LSBrms | NOISE REDUCTION PARAMETERS | | |
|---|---|---|---|---|
| | | SOFT | STD | HARD |
| 100 | $N_1$ | 1.10 | 1.00 | 0.09 |
| 200 | $N_2$ | 1.00 | 0.90 | 0.80 |
| 400 | $N_3$ | 0.90 | 0.80 | 0.70 |
| 800 | $N_4$ | 0.80 | 0.70 | 0.60 |
| 1600 | $N_5$ | 0.70 | 0.60 | 0.50 |
| 3200 | $N_6$ | 0.60 | 0.50 | 0.40 |
| 6400 | $N_7$ | 0.60 | 0.50 | 0.40 |
| 12800 | $N_8$ | 0.60 | 0.50 | 0.40 |

※ $N1 < N2 < N3 < \cdots < N8$

IMAGE PICK-UP APPARATUS AND IMAGE PROCESSING METHOD

CROSS-REFERENCE TO RELATED APPLICATIONS

This application is based upon and claims the benefit of priority from Japanese Patent Application No. 2009-170565, filed Jul. 21, 2009.

BACKGROUND

1. Technical Field

The present invention relates to an image pick-up apparatus and an image processing method.

2. Related Art

An image pick-up device such as a CCD image sensor, a CMOS image sensor, etc. is generally provided with color filters above photo acceptance surfaces of photoelectric conversion elements respectively. For example, description will be made in the case where a Bayer arrangement is used as an arrangement of the color filters.

In the case of the Bayer arrangement, G color filters which transmit green (G) light can be classified into two kinds in accordance with the pattern of color filters arranged around each of the G color filters. The first kind is a group of G color filters provided so that R color filters which transmit red (R) light are arranged in the upper and lower of each of the G color filters while B color filters which transmit blue (B) light are arranged in the left and right of each of the G color filters. The second kind is a group of G color filters provided so that B color filters are arranged in the upper and lower of each of the G color filters while R color filters are arranged in the left and right of each of the G color filters.

When color filters transmit light of the same color component but are different in arrangement pattern of adjacent filters in the aforementioned manner, variation in thickness, mask displacement at formation of color filters, etc. cause a difference in light transmittance. Because of the transmittance difference, a sensitivity difference is produced between photoelectric conversion elements located under the two kinds of G color filters respectively. A difference is produced between output signal levels because of the sensitivity difference. Lattice-shaped or horizontal stripe-shaped fixed pattern noise is produced in an image obtained by photographing because of the difference between output signal levels.

FIG. 9 is a graph showing respective output characteristics of two photoelectric conversion elements provided with the aforementioned two kinds of G color filters arranged above the photoelectric conversion elements respectively. As shown in FIG. 9, respective output signal levels of signals GR and GB are r and b with respect to the same incident light intensity, so that a difference (GR-GB level difference) is produced between output signal levels.

To correct the GR-GB level difference, at least one of the output signal level of the signal GR and the output signal level of the signal GB can be multiplied by a correction coefficient so that the characteristics of the signals GR and GB become equal to each other. For example, the following expression (1) having a correction coefficient $\alpha$ is calculated.

By the calculation, as shown in FIG. 10, the characteristic of the signal GB can be changed to characteristic of a signal GB' substantially equal to the characteristic of the signal GR, so that the difference between the output signal levels can be substantially eliminated. As another correction method, there is a method of calculating an average of output signal levels of signals GR and GB and multiplying the signals GR and GB by correction coefficients respectively to set the average as a goal.

The level of signal GB after correction=$\alpha \times$(the level b of signal GB before correction)  (1)

in which $\alpha = r/b$

Because the difference between the output signal levels is caused by optical characteristic, the difference between the output signal levels varies according to the incident angle of light from the photograph lens, the diameter of the iris, the individual difference of the image pick-up device, etc. Accordingly, for example, the maker of the image pick-up apparatus has picked up an image with constant light intensity by using the image pick-up apparatus before shipping of the image pick-up apparatus to calculate the difference between output signal levels based on image pick-up signals obtained thus and calculate a correction coefficient to eliminate the difference so that the image pick-up apparatus can be shipped after the correction coefficient is stored in a memory in the image pick-up apparatus. In this manner, the difference between the output signal levels has been corrected with the correction coefficient determined in accordance with the image pick-up apparatus.

Besides the correction of the difference between the output signal levels, noise reduction processing for reducing random noise components of image pick-up signals is performed by the image pick-up apparatus. Typically, this processing is a process of cutting high-frequency components based on a low pass filter, an averaging process between adjacent pixels, a smoothing process, etc.

In an AD converter mounted in the image pick-up apparatus, analog-to-digital conversion is performed in a state where an OB signal obtained from optical black of an image pick-up device is clamped to a target level so that a predetermined offset is added to the image pick-up signal. For this reason, it is conceived that there are two cases as to whether the noise reduction processing is performed before offset correction for subtracting the offset from the image pick-up signal after AD conversion or whether the noise reduction processing is performed after the offset correction.

It is known that good noise reduction characteristic is obtained when noise reduction processing is performed in a state where the offset is added to the image pick-up signal (see JP-A-2007-110486 and JP-A-2007-312076). It is conceived that execution of noise reduction processing before offset correction is effective for the recent image pick-up apparatus used under a high ISO sensitivity condition.

On the other hand, when the aforementioned GR-GB level difference correction is performed in a state where the offset is added to each of the signals GR and GB, there is a possibility that level difference correction cannot be performed accurately. It is therefore preferable that the GR-GB level difference correction is performed after offset correction. That is, to perform AD conversion, noise reduction, offset correction and GR-GB level difference correction successively on the image pick-up signal is effective.

The noise reduction processing reduces the noise component by averaging the image pick-up signal or the like. Therefore, the aforementioned GR-GB level difference is regarded as signal level variation caused by noise so that the value of the GR-GB level difference varies according to the strength of noise reduction processing. For this reason, there arises a case that accurate correction cannot be performed when offset correction is performed by the method according to the background art after the noise reduction processing.

This case will be described with reference to the drawings. FIG. 11 is a graph showing respective output characteristics of two photoelectric conversion elements provided with the aforementioned two kinds of G color filters arranged above the photoelectric conversion elements respectively. FIG. 11 shows a state where noise components are added to the signals GR and GB whereas FIG. 9 simply expresses the signals GR and GB as lines. FIG. 12 is a graph showing respective output characteristics of two photoelectric conversion elements provided with the aforementioned two kinds of G color filters arranged above the photoelectric conversion elements respectively in the case where noise reduction processing with a predetermined strength is applied to FIG. 11.

As shown in FIG. 12, the GR-GB level difference is changed when the strength of noise reduction processing is changed. For this reason, when a fixed correction coefficient $\alpha$ is determined so that the GR-GB level difference shown in FIG. 11 can be corrected accurately, characteristic of the corrected signal GB shown in FIG. 12 is changed to characteristic of a signal GB' shown in FIG. 13 to thereby cause over-correction (mistaken correction) that the level of the signal GB' exceeds the level of the signal GR. Because the strength of noise reduction processing is changed independently of optical characteristic such as iris, zooming, etc. but dependently on analog gain such as ISO sensitivity, such mistaken correction is apt to be found under a high ISO sensitivity photographing condition that noise reduction is emphasized particularly strongly.

JP-A-11-191889 and JP-A-2000-341700 have disclosed methods of performing correction with a fixed correction coefficient to equalize signal levels of pixels of the same color. It is however impossible for these methods to fundamentally address the case of occurrence of mistaken correction because correction is always performed with a fixed correction coefficient.

SUMMARY OF THE INVENTION

According to an aspect of the invention, an image pick-up apparatus includes an image pick-up device, a noise reduction processing portion, and a level difference correction portion. The image pick-up device includes at least three kinds of color filters and photoelectric conversion elements formed under the color filters respectively. The noise reduction processing portion applies noise reduction processing to image pick-up signals output from the image pick-up device. The level difference correction portion executes correction to reduce a level difference between first and second ones of the noise reduction-processed image pick-up signals obtained from the photoelectric conversion elements formed under two color filters which are of the same kind but different in arrangement pattern of color filters arranged around the two color filters. The level difference correction portion changes correction strength in accordance with strength of noise reduction processing executed by the noise reduction processing portion.

BRIEF DESCRIPTION OF THE DRAWINGS

FIG. 5 is a view showing an example of an LUT stored in a memory in the image pick-up apparatus shown in FIG. 4.

DETAILED DESCRIPTION

An exemplary embodiment of the invention will be described blow with reference to the drawings.

Figure 1:
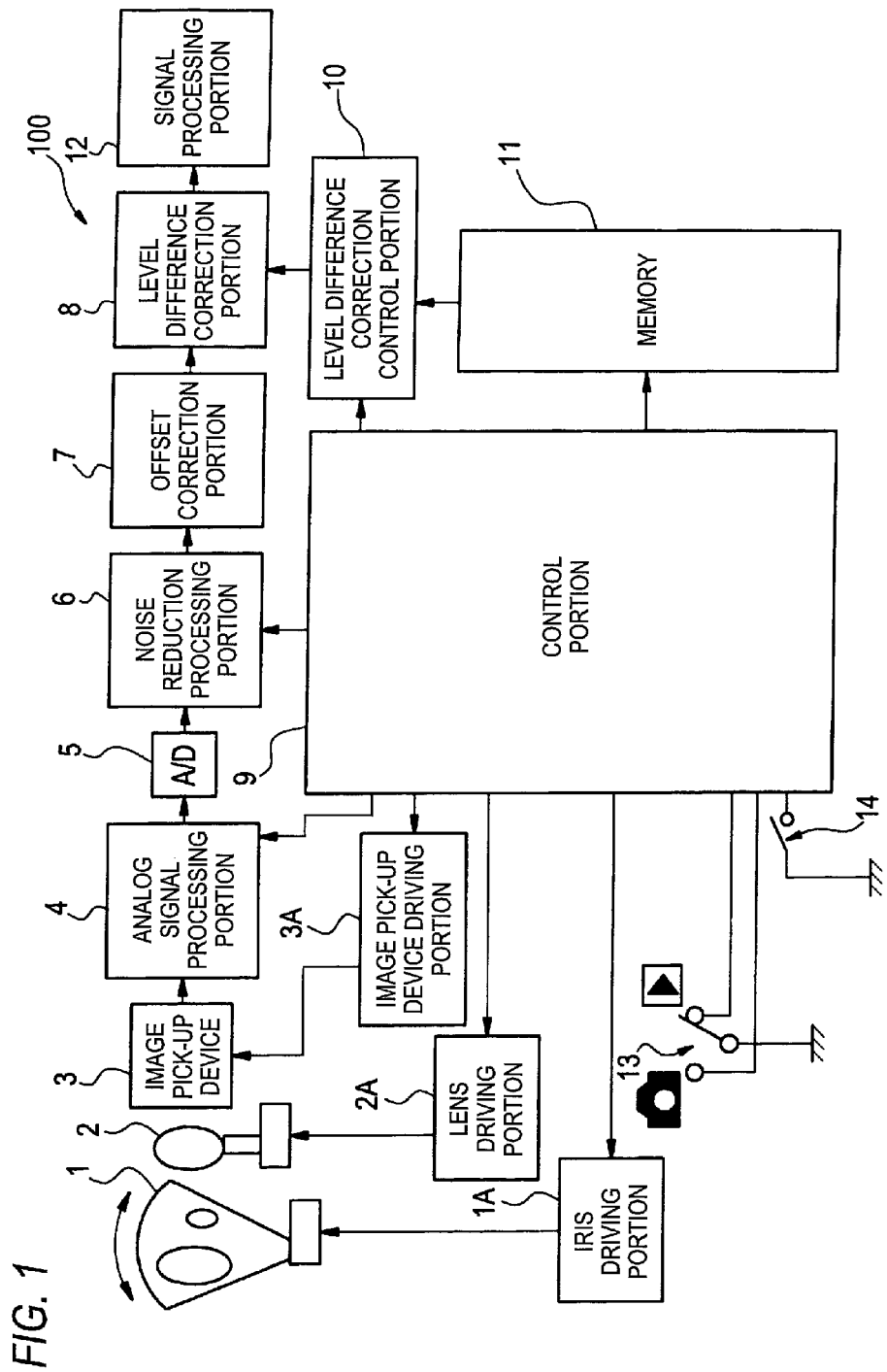
FIG. 1 is a block diagram showing the schematic configuration of an image pick-up apparatus for explaining an exemplary embodiment of the invention.

FIG. 1 is a block diagram showing the schematic configuration of an image pick-up apparatus for explaining an exemplary embodiment of the invention. For example, the image pick-up apparatus is used as an image pick-up module mounted in a digital camera, a video camera, an electronic endoscope, a cellular phone, etc.

The image pick-up apparatus shown in FIG. 1 includes an iris 1, a focus lens 2, an image pick-up device 3, an analog signal processing portion 4, an AD conversion portion 5, a noise reduction processing portion 6, an offset correction portion 7, a level difference correction portion 8, a control portion 9 for generally controlling the whole image pick-up apparatus, a level difference correction control portion 10, a memory 11, a signal processing portion 12, an iris driving portion 1A, a lens driving portion 2A, an image pick-up device driving portion 3A, a photograph/reproduction changeover switch 13, and a release switch 14.

The iris 1 adjusts the intensity of light incident on the focus lens 2. The value of the iris is controlled by the iris driving portion 1A. The focus lens 2 is an optical system for focusing on the image pick-up device 3. The focal point of the focus lens 2 is controlled by the lens driving portion 2A.

For example, the image pick-up device 3 is a CCD or CMOS image sensor which includes photoelectric conversion elements (photodiodes) provided with color filters above a photo acceptance surface. Besides the photoelectric conversion elements, an OB region for detecting an optical black level is included in the image pick-up device 3. For example, the OB region is formed by shaded photoelectric conversion elements. The image pick-up device driving portion 3A supplies predetermined pulses to the image pick-up device 3 to drive the image pick-up device 3 to output image pick-up signals corresponding to electric charge produced in the photoelectric conversion elements and the OB region included in the image pick-up device, to the outside.

Figure 2:
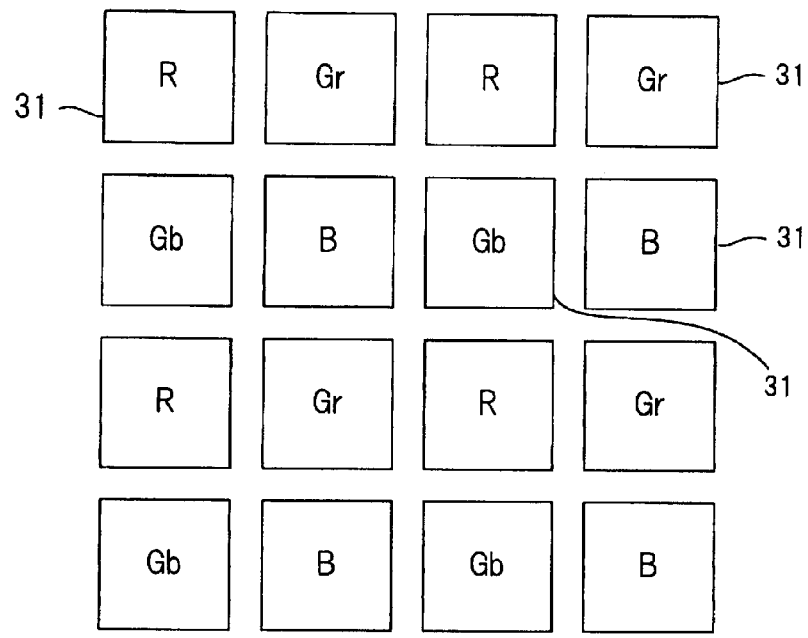
FIG. 2 is a schematic plan view showing an example of configuration of an image pick-up device in the image pick-up apparatus shown in FIG. 1.

FIG. 2 is a schematic plan view showing an example of configuration of the image pick-up device 3 in the image pick-up apparatus shown in FIG. 1. The image pick-up device shown in FIG. 2 has photoelectric conversion elements 31 arranged two-dimensionally (like a tetragonal lattice in FIG. 2) in a horizontal direction and a vertical direction perpendicular to the horizontal direction on a board.

Color filters are provided above the photoelectric conversion elements respectively. The arrangement of the color filters is a Bayer arrangement. In FIG. 2, the character "R" is given to each photoelectric conversion element 31 provided with an R color filter above the photo acceptance surface. The character "B" is given to each photoelectric conversion element 31 provided with a B color filter above the photo acceptance surface. The character "Gr" is given to each photoelectric conversion element 31 (hereinafter referred to as Gr photoelectric conversion element 31) provided with a G color filter (hereinafter referred to as Gr color filter) above the photo acceptance surface and horizontally adjacent to R color filters. The character "Gb" is given to each photoelectric conversion element 31 (hereinafter referred to as Gb photoelectric conversion element 31) provided with a G color filter (hereinafter referred to as Gb color filter) above the photo acceptance surface and horizontally adjacent to B color filters.

In this manner, in the Bayer arrangement, G color filters are classified into two kinds, that is, Gr color filters and Gb color filters, by the arrangement pattern of color filters R and B arranged around each G color filter. For this reason, a level difference caused by optical characteristic of the image pick-up apparatus is produced between a signal obtained from a Gr photoelectric conversion element 31 and a signal obtained from a Gb photoelectric conversion element 31.

Figure 3:
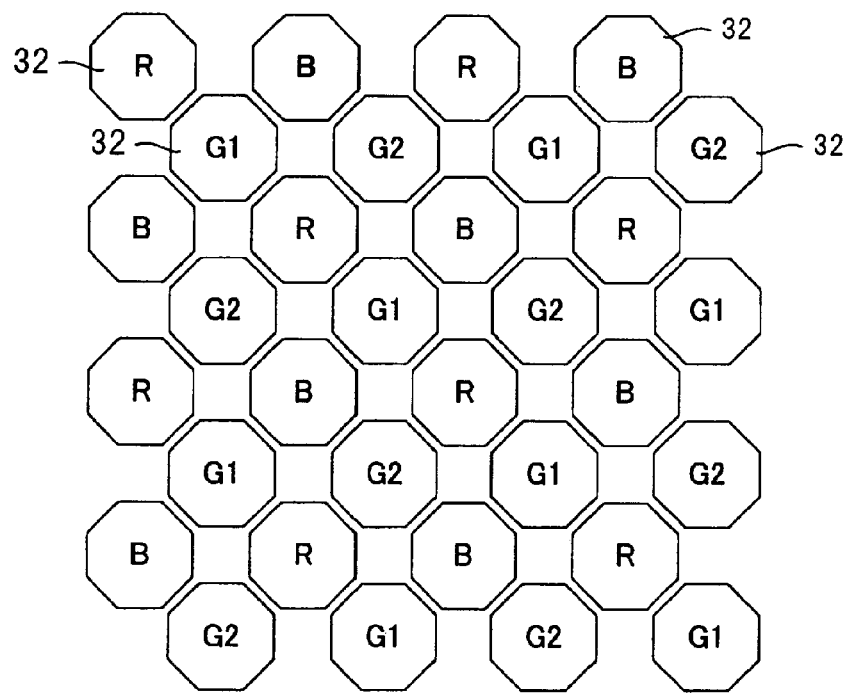
FIG. 3 is a schematic plan view showing another example of configuration of the image pick-up device in the image pick-up apparatus shown in FIG. 1.

FIG. 3 is a schematic plan view showing another example of configuration of the image pick-up device 3 in the image pick-up apparatus shown in FIG. 1. The image pick-up device shown in FIG. 3 has photoelectric conversion elements 32 arranged two-dimensionally in a horizontal direction and a vertical direction perpendicular to the horizontal direction on a board. The photoelectric conversion elements 32 are arranged so that even-numbered rows of photoelectric conversion elements are shifted horizontally by a half of the photoelectric conversion element pitch from odd-numbered rows of photoelectric conversion elements respectively while even-numbered columns of photoelectric conversion elements are shifted vertically by a half of the photoelectric conversion element pitch from odd-numbered columns of photoelectric conversion elements respectively.

Color filters are provided above the photoelectric conversion elements 32 respectively. In FIG. 3, the character "R" is given to each photoelectric conversion element 32 provided with an R color filter above the photo acceptance surface. The character "B" is given to each photoelectric conversion element 32 provided with a B color filter above the photo acceptance surface. The character "G1" is given to each photoelectric conversion element 32 provided with a G color filter above the photo acceptance surface and adjacent to a B color filter arranged obliquely rightward at an angle of 45 degrees. The character "G2" is given to each photoelectric conversion element 32 provided with a G color filter above the photo acceptance surface and adjacent to an R color filter arranged obliquely rightward at an angle of 45 degrees.

Even in this configuration, the aforementioned level difference is produced because G color filters are classified into two kinds by the arrangement pattern of color filters R and B arranged around each G color filter.

Incidentally, in each of the configurations shown in FIGS. 2 and 3, end portions of each row of photoelectric conversion elements are shaded so that the shaded photoelectric conversion elements serve as elements (hereinafter referred to as OB elements) for detecting the optical black level. Description will be made below on the assumption that the image pick-up device 3 is configured as shown in FIG. 2.

Referring back to FIG. 1, the analog signal processing portion 4 applies predetermined analog signal processing to analog image pick-up signals output from the image pick-up device 3 and has a CDS circuit and an AGC circuit not shown. The CDS circuit applies correlated double sampling to the image pick-up signals. The AGC circuit amplifies the image pick-up signals with a predetermined analog gain after the correlated double sampling. The value of the analog gain is set automatically by the control portion 9 in accordance with photograph sensitivity (ISO sensitivity) set in the image pick-up apparatus. Specifically, the control portion 9 sets the analog gain to be large as the ISO sensitivity becomes large. The ISO sensitivity can be set externally by a user's operation of the image pick-up apparatus or can be set automatically in accordance with a photograph mode by the control portion 9.

The AD conversion portion 5 converts the image pick-up signals output from the AGC circuit of the analog signal processing portion 4 into digital signals. The AD conversion portion 5 further performs a clamping process for clamping signals output from the OB elements (hereinafter referred to as OB signals) and included in the image pick-up signals, to a target level. By the clamping process, analog-to-digital conversion is performed in a state where an offset component is included in the image pick-up signals.

The noise reduction processing portion 6 applies noise reduction processing to the digital image pick-up signals output from the AD conversion portion 5 to reduce random noise. Typically, the noise reduction processing is a process of cutting a high-frequency component based on a low pass filter, an averaging process between adjacent pixels, a smoothing process, etc.

The strength (e.g. the degree of averaging) of noise reduction processing executed by the noise reduction processing portion 6 is set by the control portion 9 in accordance with the analog gain set by the AGC circuit. Specifically, the control portion 9 sets the strength of noise reduction processing to be large as the analog gain becomes large. Incidentally, because the analog gain set by the AGC circuit is determined in accordance with the ISO sensitivity, it can be said that the strength of noise reduction processing is set in accordance with the ISO sensitivity.

The offset correction portion 7 performs an offset correction process (black level correction process) for subtracting the offset component at AD conversion executed by the AD conversion portion 5 from the image pick-up signals after the noise reduction processing. For example, the offset correction portion 7 performs offset correction in such a manner that an average of values of OB signals obtained from OB elements in any row of photoelectric conversion elements 31 is calculated as the black level of the row and the black level is subtracted from the value of a signal obtained from each photoelectric conversion element 31 in the row.

The level difference correction portion 8 performs correction for reducing the level difference to signals of the same color component with difference generated in level in the offset-corrected image pick-up signals (that is, a first signal obtained from Gr photoelectric conversion elements 31 and a second signal obtained from Gb photoelectric conversion elements 31). Specifically, the level difference correction portion 8 performs a process for multiplying at least one of the first and second signals by a correction coefficient $\beta$ to substantially equalize the signal levels of the first and second signals.

The signal processing portion 12 applies predetermined digital signal processing to the image pick-up signals corrected by the level difference correction portion 8 to thereby generate image data to be displayed on a display device and to be recorded on a recording medium.

The level difference correction control portion 10 sets the correction coefficient $\beta$ used in the level difference correction portion 8 in accordance with the strength of noise reduction processing set by the control portion 9 and executed by the noise reduction processing portion 6. Specifically, the level difference correction control portion 10 sets the correction coefficient $\beta$ to be small as the strength of noise reduction processing set by the control portion 9 becomes large.

To set the correction coefficient $\beta$, a look-up table (LUT) where the correction coefficient $\beta$ is stored while associated with the strength (e.g. hard, standard or soft) of noise reduction processing or a function using the strength of noise reduction processing as a variable for calculating the correction coefficient $\beta$ is stored in the memory 11 in advance.

When the strength of noise reduction processing is set by the control portion 9, the level difference correction control portion 10 reads a correction coefficient $\beta$ corresponding to the set strength of noise reduction processing from the LUT stored in the memory 11 and sets the correction coefficient $\beta$ as the correction coefficient used in the level difference correction portion 8. Alternatively, the level difference correction control portion 10 calculates a correction coefficient $\beta$ based on the function stored in the memory 11 and the strength of noise reduction processing set by the control portion 9 and sets the correction coefficient f as the correction coefficient used in the level difference correction portion 8.

Incidentally, as described above, the strength of noise reduction processing correlates with the ISO sensitivity. Accordingly, the level difference correction control portion 10 may set the correction coefficient $\beta$ in accordance with the ISO sensitivity set by manual operation or automatically by the control portion 9. Also in this case, an LUT where the correction coefficient $\beta$ is stored while associated with the ISO sensitivity allowed to be set in the image pick-up apparatus or a function using the ISO sensitivity as a variable for calculating the correction coefficient $\beta$ is stored in the memory 11. Then, the level difference correction control portion 10 may read a correction coefficient $\beta$ corresponding to the set ISO sensitivity from the LUT and set the correction coefficient $\beta$. Alternatively, the level difference correction control portion 10 may calculate and set a correction coefficient $\beta$ based on the function stored in the memory 11 and the set ISO sensitivity.

As described above, the ISO sensitivity also correlates with the analog gain of the AGC circuit. Accordingly, the level difference correction control portion 10 may set the correction coefficient $\beta$ in accordance with the analog gain of the AGC circuit set by the control portion 9. Also in this case, an LUT where the correction coefficient $\beta$ is stored while associated with the analog gain allowed to be set in the image pick-up apparatus or a function using the analog gain as a variable for calculating the correction coefficient $\beta$ is stored in the memory 11 in advance. Then, the level difference correction control portion 10 may read a correction coefficient $\beta$ corresponding to the analog gain set by the control portion 9 from the LUT and set the correction coefficient $\beta$Alternatively, the level difference correction control portion 10 may calculate a correction coefficient $\beta$ based on the function stored in the memory 11 and the analog gain set by the control portion 9 and set the correction coefficient $\beta$.

Some image pick-up apparatus can set the strength of noise reduction processing manually. Therefore, in such an image pick-up apparatus, the level difference correction control portion may set the correction coefficient $\beta$ in accordance with the strength of noise reduction processing set by a user's operation. Also in this case, an LUT where the correction coefficient $\beta$ is stored while associated with the strength of noise reduction processing allowed to be set in the image pick-up apparatus or a function using the strength of noise reduction processing as a variable for calculating the correction coefficient $\beta$ is stored in the memory 11 in advance. Then, the level difference correction control portion 10 may read a correction coefficient $\beta$ corresponding to the set strength of noise reduction processing from the LUT and set the correction coefficient $\beta$. Alternatively, the level difference correction control portion 10 may calculate a correction coefficient $\beta$ based on the function stored in the memory 11 and the strength of noise reduction processing set by the control portion 9 and set the correction coefficient $\beta$.

The ISO sensitivity and the analog gain of the AGC circuit also correlate with the level of OB signals. High ISO sensitivity, that is, large analog gain of the AGC circuit means that the noise component is amplified with the gain. Accordingly, the level of OB signals increases as the ISO sensitivity and the analog gain of the AGC circuit increase. Therefore, the level difference correction control portion 10 may set the correction coefficient $\beta$ in accordance with the level of OB signals in the image pick-up signals output from the analog signal processing portion 4.

Figure 4:
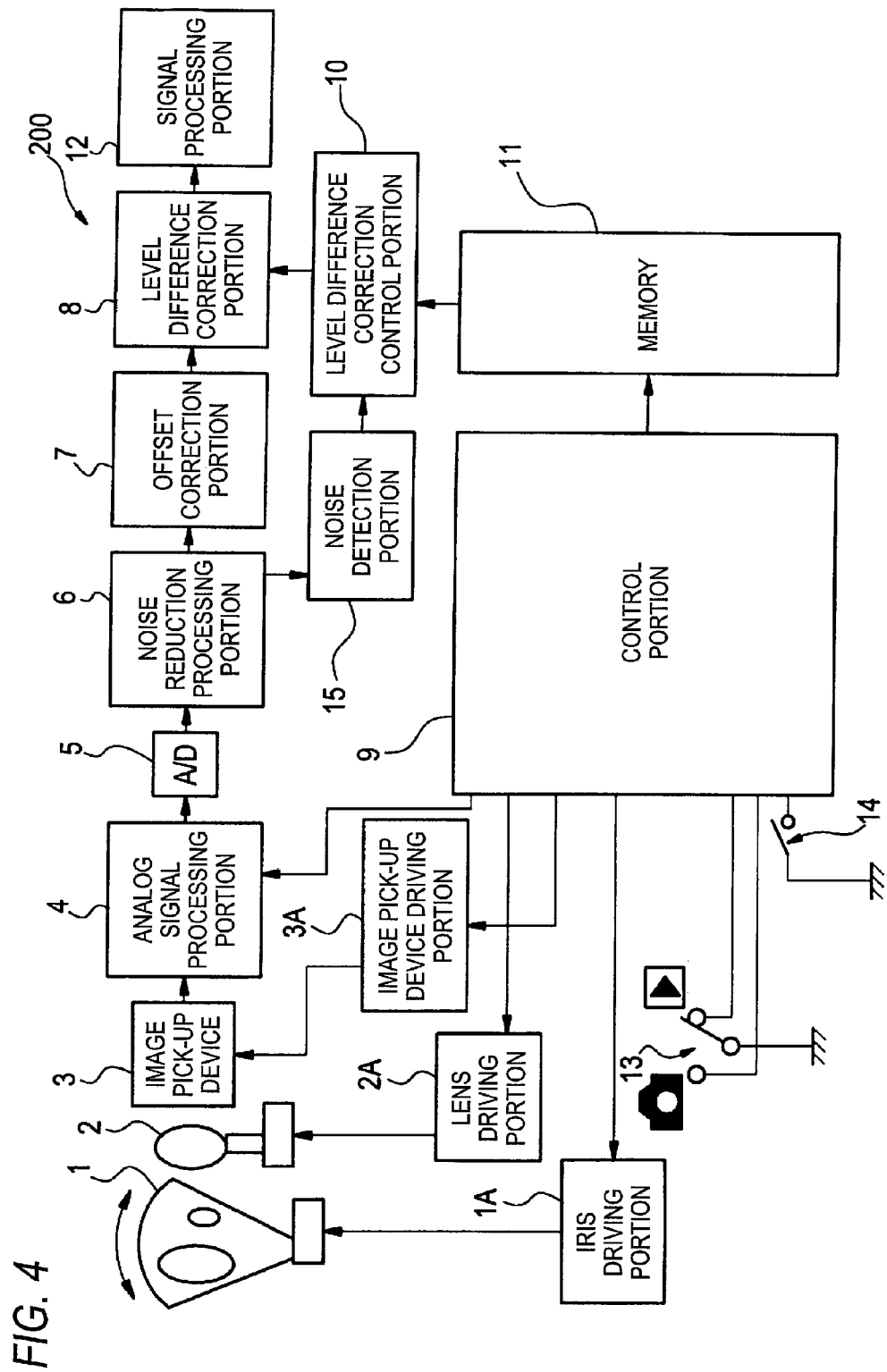
FIG. 4 is a diagram showing an example of configuration of the image pick-up apparatus in the case where a correction coefficient $\beta$ is set in accordance with the level of signals obtained from OB elements of the image pick-up device.

FIG. 4 is a diagram showing an example of configuration of the image pick-up apparatus in the case where the correction coefficient $\beta$ is set in accordance with the level of OB signals. The image pick-up apparatus 200 shown in FIG. 4 is configured so that a noise detection portion 15 is added to the image pick-up apparatus 100 shown in FIG. 1.

The noise detection portion 15 acquires image pick-up signals processed by the noise reduction processing portion 6 and detects the noise level of OB signals included in the image pick-up signals. For example, the noise detection portion 15 calculates the standard deviation of all OB signals and detects the standard deviation as the noise level. The level difference correction control portion 10 is informed of the detected noise level.

The level difference correction control portion 10 of the image pick-up apparatus 200 shown in FIG. 4 sets the correction coefficient $\beta$ in accordance with the noise level input from the noise detection portion 15. Also in this case, a noise level is calculated in advance in accordance with each ISO sensitivity or each analog gain of the AGC circuit allowed to be set in the image pick-up apparatus, and an LUT where the correction coefficient $\beta$ is stored while associated with the noise level or a function using the noise level as a variable for calculating the correction coefficient $\beta$ is stored in the memory 11 in advance. Then, the level difference correction control portion 10 may read a correction coefficient β corresponding to the noise level input from the noise detection portion 15 from the LUT and set the correction coefficient β. Alternatively, the level difference correction control portion 10 may calculate a correction coefficient β based on the function stored in the memory 11 and the noise level input from the noise detection portion 15 and set the correction coefficient β.

The LUT of the correction coefficient β associated with the strength of noise reduction processing, the ISO sensitivity or the analog gain can be generated before shipping of the image pick-up apparatus in such a manner that dark-time photographing is performed several times while the strength of noise reduction processing, the ISO sensitivity or the analog gain is changed, so that the correction coefficient β is calculated to substantially eliminate the level difference between the first and second signals obtained by each dark-time photographing.

The function based on the strength of noise reduction processing, the ISO sensitivity or the analog gain and the correction coefficient β can be also generated in such a manner that dark-time photographing is performed several times while the strength of noise reduction processing, the ISO sensitivity or the analog gain is changed, so that the correction coefficient β is calculated to substantially eliminate the level difference between the first and second signals obtained by each dark-time photographing, and that the function is generated based on the correction coefficient β and the strength of noise reduction processing, the ISO sensitivity or the analog gain obtained by each dark-time photographing.

The LUT of the correction coefficient β associated with the noise level can be also generated before shipping of the image pick-up apparatus in such a manner that photographing under constant light intensity is performed several times while the ISO sensitivity or the analog gain is changed so that the noise level at each photographing is obtained, and the correction coefficient β is calculated to substantially eliminate the level difference between the first and second signals obtained by each photographing.

The function based on the noise level and the correction coefficient β can be also generated in such a manner that photographing under constant light intensity is performed several times while the ISO sensitivity or the analog gain is changed so that the noise level at each photographing is obtained, and the correction coefficient β is calculated to substantially eliminate the level difference between the first and second signals obtained by each photographing, and that the function is generated based on the correction coefficient β the noise level at each photographing.

FIG. 5 is a view showing an example of the LUT stored in the memory in the image pick-up apparatus shown in FIG. 4. ISO sensitivities (100, 200, 400, ..., 12800) and noise levels ($N_1, N_2, N_3, ..., N_8$) obtained at dark-time photographing with the ISO sensitivities respectively are stored in the LUT shown in FIG. 5. Correction coefficients β are also stored in the LUT so that the level difference between the first and second signals at each ISO sensitivity and each noise level can be substantially eliminated. Incidentally, three values in accordance with three kinds of strengths (SOFT, STD and HARD) of noise reduction processing are stored as the correction coefficient β corresponding to each ISO sensitivity and each noise level.

As is obvious from the LUT shown in FIG. 5, when the ISO sensitivity becomes high, the correction coefficient β becomes small because the analog gain becomes large and the strength of noise reduction processing becomes large. Furthermore, when the ISO sensitivity becomes high, the correction coefficient β becomes small because the noise level becomes large and the strength of noise reduction processing becomes large. When the strength of noise reduction processing becomes large even though the ISO sensitivity or the noise level is constant, the correction coefficient β becomes small. When such an LUT is stored in the memory 11, optimum level difference correction can be performed even under various photographing conditions.

The operation of the aforementioned image pick-up apparatus up to setting of the correction coefficient β will be described below.

Figure 6:
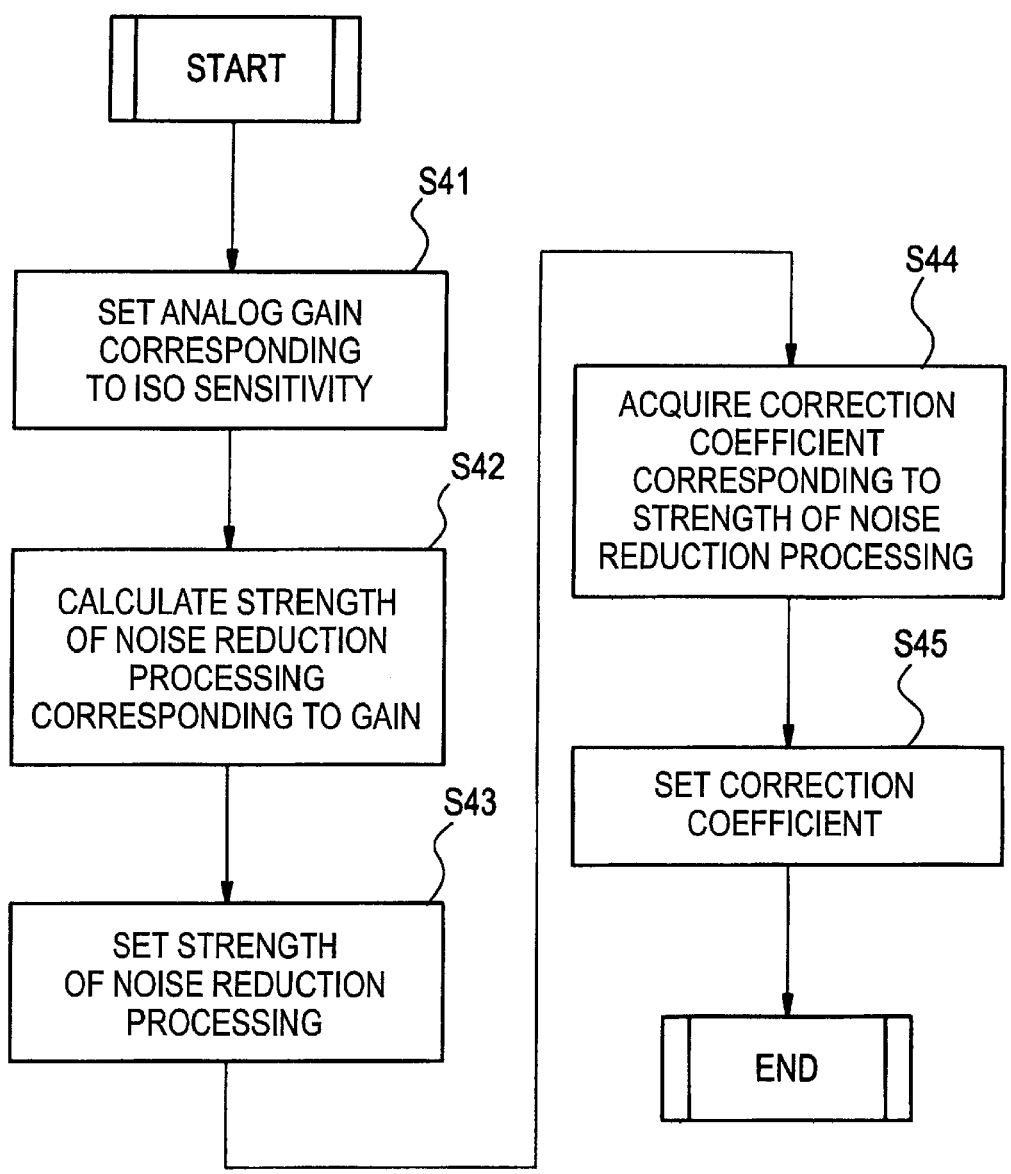
FIG. 6 is a flow chart for explaining an example of operation of the image pick-up apparatus shown in FIG. 1 before setting of the correction coefficient $\beta$.

FIG. 6 is a flow chart for explaining an example of the operation of the image pick-up apparatus shown in FIG. 1 up to setting of the correction coefficient β. When ISO sensitivity is set by a user's operation or the like, the control portion 9 sets an analog gain corresponding to the ISO sensitivity for the AGC circuit (step S41).

Then, the control portion 9 calculates the strength of noise reduction processing corresponding to the set analog gain (step S42) and sets it for the noise reduction processing portion 6 (step S43).

Then, the level difference correction control portion 10 acquires a correction coefficient β corresponding to the strength of noise reduction processing set by the control portion 9 by using the LUT or function stored in the memory 11 (step S44) and sets the correction coefficient β in the level difference correction portion 8 (step S45).

Then, an image is picked up by the image pick-up device 3, and noise reduction processing with the set strength is applied to the image pick-up signals. Successively, offset correction is performed and level difference correction is performed in accordance with the correction coefficient β. After the level difference correction, the image pick-up signals are subjected to digital signal processing by the signal processing portion 12, and recorded as image data on a recording medium.

Figure 7:
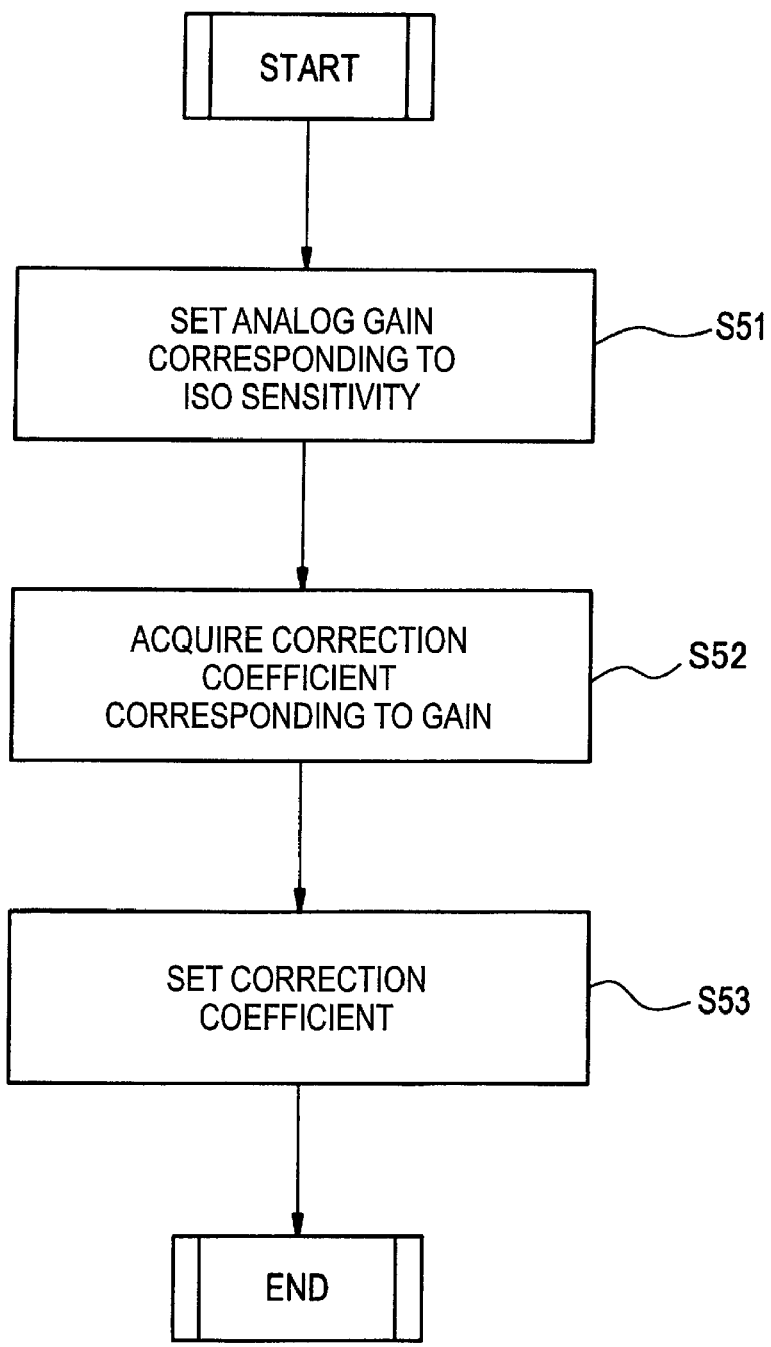
FIG. 7 is a flow chart for explaining another example of operation of the image pick-up apparatus shown in FIG. 1 before setting of the correction coefficient $\beta$.

FIG. 7 is a flow chart for explaining another example of the operation of the image pick-up apparatus shown in FIG. 1 up to setting of the correction coefficient β. When ISO sensitivity is set by a user's operation or the like, the control portion 9 sets an analog gain corresponding to the ISO sensitivity for the AGC circuit (step S51).

Then, the level difference correction control portion 10 acquires a correction coefficient β corresponding to the set analog gain by using the LUT or function stored in the memory 11 (step S52) and sets the correction coefficient β in the level difference correction portion 8 (step S53).

Then, an image is picked up by the image pick-up device 3, and noise reduction processing with the set strength is applied to the image pick-up signals. Successively, offset correction is performed, and level difference correction is performed in accordance with the correction coefficient β. After the level difference correction, the image pick-up signals are subjected to digital signal processing by the signal processing portion 12, and recorded as image data on a recording medium.

According to the operation example shown in FIG. 7, the correction coefficient β can be set rapidly compared with the operation example shown in FIG. 6 because the correction coefficient β can be calculated directly based on the analog gain.

Figure 8:
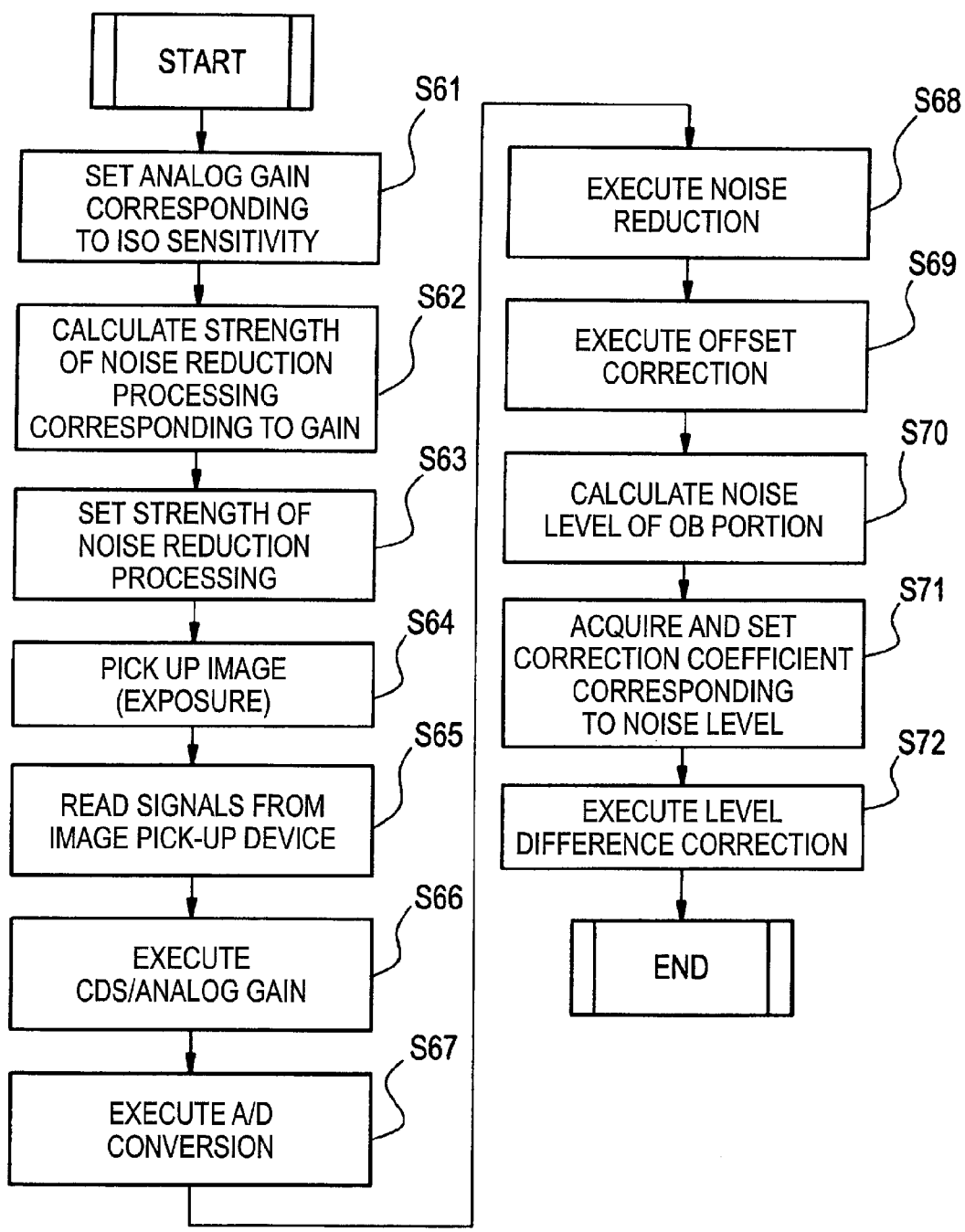
FIG. 8 is a flow chart for explaining an example of operation of the image pick-up apparatus shown in FIG. 4 before setting of the correction coefficient $\beta$.
Figure 9:
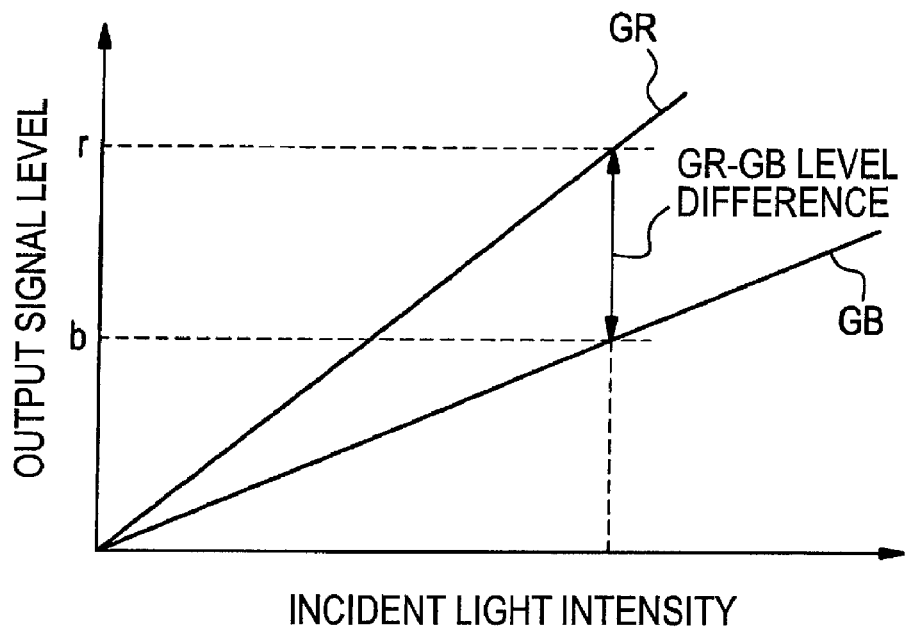
FIG. 9 is a graph showing respective output characteristics of two photoelectric conversion elements provided with filters which are of the same color but different in transmittance and which are provided above the photoelectric conversion elements respectively.
Figure 10:
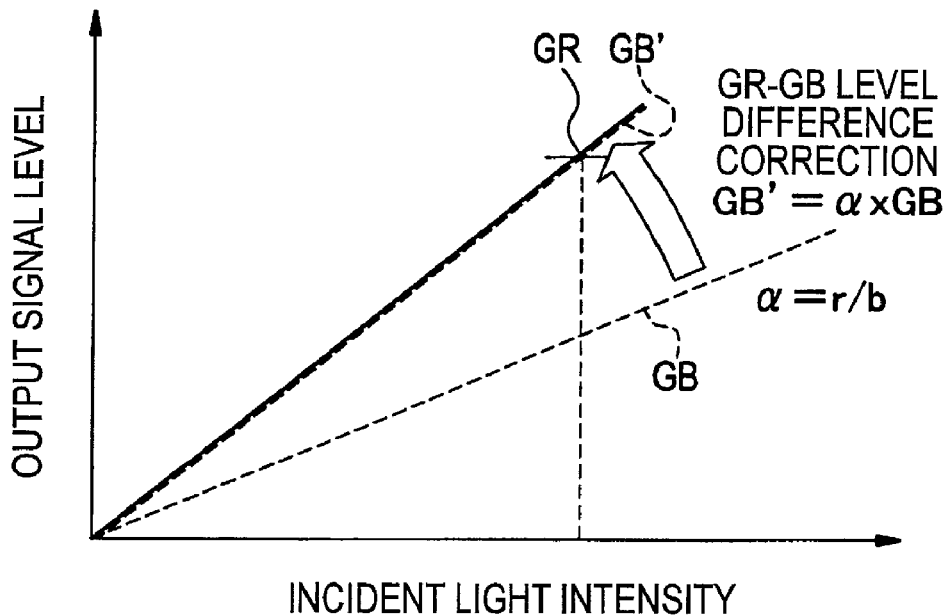
FIG. 10 is a graph showing a state where a GB-GR level difference shown in FIG. 9 is corrected.
Figure 11:
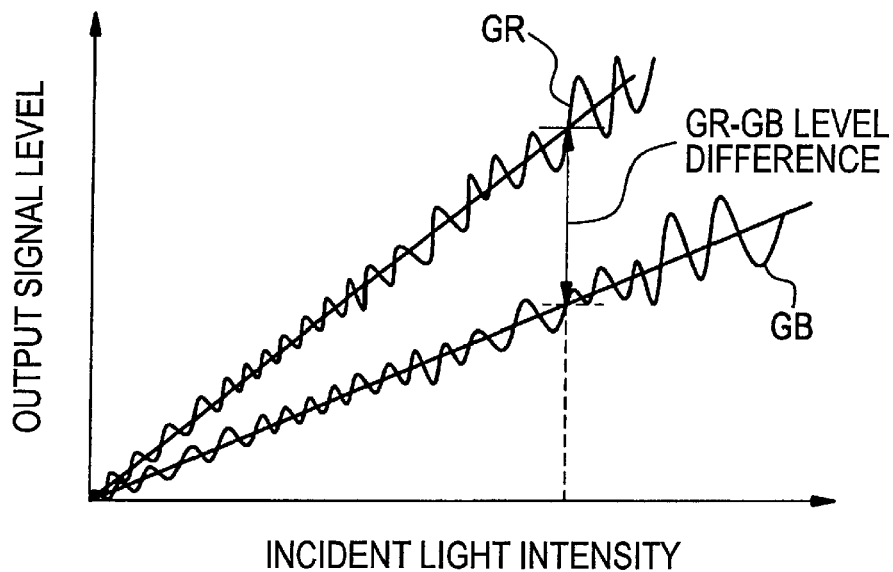
FIG. 11 is a graph showing respective output characteristics of two photoelectric conversion elements provided with filters which are of the same color but different in transmittance and which are provided above the photoelectric conversion elements respectively.
Figure 12:
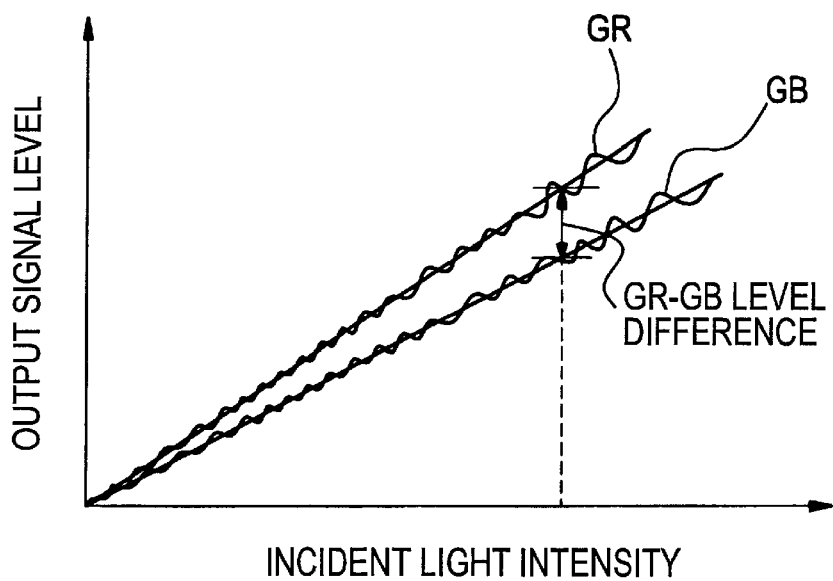
FIG. 12 is a graph showing respective output characteristics of two photoelectric conversion elements provided with filters which are of the same color but different in transmittance and which are provided above the photoelectric conversion elements respectively in the case where noise reduction processing is performed more strongly than that in FIG. 11.
Figure 13:
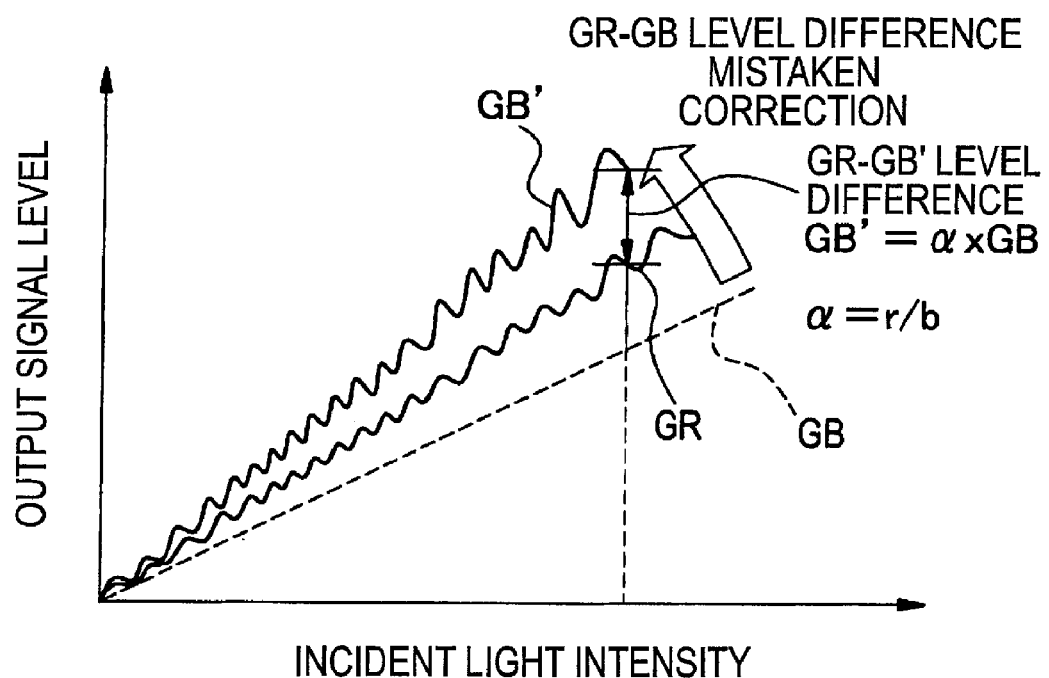
FIG. 13 is a graph showing a state where a GB-GR level difference shown in FIG. 12 is corrected with such a correction coefficient $\alpha$ that a GB-GR level difference shown in FIG. 11 can be corrected accurately.

FIG. 8 is a flow chart for explaining an example of the operation of the image pick-up apparatus shown in FIG. 4 before setting of the correction coefficient β. When ISO sensitivity is set by a user's operation or the like, the control portion 9 sets an analog gain corresponding to the ISO sensitivity for the AGC circuit (step S61).

Then, the control portion 9 calculates the strength of noise reduction processing corresponding to the set analog gain (step S62) and sets it for the noise reduction processing portion 6 (step S63).

Then, the control portion 9 picks up an image by using the image pick-up device 3 (step S64), and reads image pick-up signals from the image pick-up device 3 (step S65). When the image pick-up signals are read, the image pick-up signals are subjected to correlated double sampling and amplification successively (step S66), and then AD conversion is performed (step S67).

Then, noise reduction processing is applied to the image pick-up signals after the AD conversion (step S68), and then offset correction is performed (step S69). The noise level is calculated from the image pick-up signals after the offset correction (step S70).

Then, the level difference correction control portion 10 acquires a correction coefficient β corresponding to the calculated noise level by using the LUT or function stored in the memory 11, and sets the correction coefficient β in the level difference correction portion 8 (step S71).

Then, the image pick-up signals after the offset correction are subjected to level difference correction in accordance with the correction coefficient β (step S72). After the level difference correction, the image pick-up signals are subjected to digital signal processing by the signal processing portion 12, and recorded as image data on a recording medium.

According to the aforementioned image pick-up apparatus, level difference correction can be performed with optimum strength in accordance with the strength of noise reduction processing (synonymous with the ISO sensitivity, the analog gain or the noise level). Accordingly, signal levels obtained from photoelectric conversion elements provided with color filters of the same color provided above photo acceptance surfaces of the photoelectric conversion elements respectively can be equalized to suppress occurrence of lattice-shaped or horizontal stripe-shaped fixed pattern noise to thereby improve image quality. Particularly even in a photographing condition such as a high ISO sensitivity condition that the level difference between pixels of the same color is reduced greatly, over-correction caused by level difference correction can be prevented to thereby improve image quality while the effect of noise reduction processing can be sustained to thereby reduce noise effectively.

The configuration that the strength of level difference correction is changed in accordance with the strength of noise reduction processing is effective for a method of performing noise reduction processing before level difference correction. Because the aforementioned image pick-up apparatus uses this method and is configured so that offset correction is performed before level difference correction, accuracy in level difference correction can be improved more greatly.

Although description has been made in the case where an image pick-up device including three kinds of color filters is used as an example, the level difference between pixels of the same color can be corrected likewise in accordance with the strength of noise reduction processing even when a pick-up device including four or more kinds of color filters are used. The color filters are not limited to filters of primary colors but may be filters of complementary colors.

If the value of the ISO sensitivity or analog gain works together with the strength of noise reduction processing as described above, it is not essential that the strength of noise reduction processing is referred to for determining the correction coefficient β, and it is possible that either the value of the ISO sensitivity or the value of the analog gain is referred to for determining the correction coefficient.

As described above, the following items are disclosed in this specification.

The disclosed image pick-up apparatus includes: an image pick-up device including at least three kinds of color filters, and photoelectric conversion elements formed under the color filters respectively; a noise reduction processing portion which applies noise reduction processing to image pick-up signals output from the image pick-up device; and a level difference correction portion which performs correction for reducing a level difference between first and second ones of the noise reduction-processed image pick-up signals obtained from the photoelectric conversion elements formed under two color filters which are of the same kind but different in arrangement pattern of color filters arranged around each of the two color filters, wherein the level difference correction portion changes correction strength in accordance with the strength of noise reduction processing executed by the noise reduction processing portion.

According to this configuration, the correction strength can be changed in accordance with the strength of noise reduction processing, so that the level difference between the first and second image pick-up signals can be reduced most suitably even under various photographing conditions.

In the disclosed image pick-up apparatus, the noise reduction processing portion sets the strength of noise reduction processing to be large as photograph sensitivity set in the image pick-up apparatus becomes large, and the level difference correction portion changes the correction strength in accordance with the set photograph sensitivity.

According to this configuration, optimum correction can be performed in accordance with the photograph sensitivity set in the image pick-up apparatus, so that an image can be picked up with high image quality even under a high sensitivity photographing condition that noise increases.

The disclosed image pick-up apparatus further includes an amplification portion which amplifies analog image pick-up signals output from the image pick-up device with a predetermined gain, wherein: the noise reduction processing portion sets the strength of noise reduction processing to be large as the predetermined gain becomes large; and the level difference correction portion changes the correction strength in accordance with the predetermined gain.

According to this configuration, optimum correction can be performed in accordance with the analog gain used for amplifying the image pick-up signals, so that an image can be picked up with high image quality even under a high sensitivity photographing condition that noise becomes large because the gain becomes large.

The disclosed image pick-up apparatus further includes: an amplification portion which amplifies analog image pick-up signals output from the image pick-up device with a predetermined gain; and a detection portion which detects a noise level of a black level signal included in the image pick-up signals, wherein: the noise reduction processing portion sets the strength of noise reduction processing to be large as photograph sensitivity set in the image pick-up apparatus or the predetermined gain becomes large; the noise level of the black level signal increases as the photograph sensitivity set in the image pick-up apparatus or the predetermined gain increases; and the level difference correction portion changes the correction strength in accordance with the noise level of the black level signal.

According to this configuration, optimum correction can be performed in accordance with the noise level of the black level signal, so that an image can be picked up with high image quality even under a high sensitivity photographing condition that noise becomes large because the set photograph sensitivity or gain becomes large.

The disclosed image pick-up apparatus further includes a storage portion which stores parameters for determining the correction strength in accordance with the strength of the noise reduction processing, wherein the level difference correction portion reads the parameters corresponding to the set strength of the noise reduction processing from the storage portion and executes correction in accordance with the parameters.

The disclosed image pick-up apparatus further includes a storage portion which stores a function using the strength of the noise reduction processing as a variable to calculate parameters for determining the correction strength, wherein the level difference correction portion executes correction in accordance with the parameters calculated based on the set strength of the noise reduction processing and the function.

The disclosed image pick-up apparatus further includes a storage portion which stores parameters for determining the correction strength in accordance with the set photograph sensitivity, wherein the level difference correction portion reads the parameters corresponding to the set photograph sensitivity from the storage portion and executes correction in accordance with the parameters.

The disclosed image pick-up apparatus further includes a storage portion which stores a function using the set photograph sensitivity as a variable to calculate parameters for determining the correction strength, wherein the level difference correction portion executes correction in accordance with the parameters calculated based on the set photograph sensitivity and the function.

The disclosed image pick-up apparatus further includes a storage portion which stores parameters for determining the correction strength in accordance with the predetermined gain, wherein the level difference correction portion reads the parameters corresponding to the predetermined gain from the storage portion and executes correction in accordance with the parameters.

The disclosed image pick-up apparatus further includes a storage portion which stores a function using the predetermined gain as a variable to calculate parameters for determining the correction strength, wherein the level difference correction portion executes correction in accordance with the parameters calculated based on the predetermined gain and the function.

The disclosed image pick-up apparatus further includes a storage portion which stores parameters for determining the correction strength in accordance with the noise level of the black level signal, wherein the level difference correction portion reads the parameters corresponding to the noise level of the black level signal from the storage portion and executes correction in accordance with the parameters.

The disclosed image pick-up apparatus further includes a storage portion which stores a function using the noise level of the black level signal as a variable to calculate parameters for determining the correction strength, wherein the level difference correction portion executes correction in accordance with the parameters calculated based on the noise level of the black level signal and the function.

In the disclosed image pick-up apparatus, the level difference correction portion changes the correction strength by changing a correction coefficient by which at least one of the first and second image pick-up signals is multiplied.

In the disclosed image pick-up apparatus, the level difference correction portion sets the correction coefficient to be small as the strength of noise reduction processing becomes large.

Because the level difference between the first and second image pick-up signals becomes small as the strength of noise reduction processing becomes large, correction accuracy can be increased when the correction coefficient is set to be smaller.

The disclosed image pick-up apparatus further includes: an AD conversion portion which converts analog image pick-up signals output from the image pick-up device into digital signals; and an offset subtraction portion which subtracts an offset component at AD conversion executed by the AD conversion portion from the image pick-up signals after the noise reduction processing, wherein the level difference correction portion applies correction for reducing the level difference to the image pick-up signals after subtraction of the offset component.

According to this configuration, correction for reducing the level difference is performed after the offset is subtracted, so that more accurate correction can be performed.

The disclosed signal processing method includes the steps of: applying noise reduction processing to image pick-up signals output from an image pick-up device including at least three kinds of color filters, and photoelectric conversion elements formed under the color filters respectively (the noise reduction processing step); and executing correction for reducing a level difference between first and second ones of the noise reduction-processed image pick-up signals obtained from the photoelectric conversion elements formed under two color filters of the same kind but different in arrangement pattern of color filters arranged around the two color filters (the level difference correction step), wherein the level difference correction step changes correction strength in accordance with strength of the noise reduction processing executed by the noise reduction processing step.

In the disclosed signal processing method, the strength of the noise reduction processing is set to be large as photograph sensitivity set in an image pick-up apparatus becomes large, and the level difference correction step changes the correction strength in accordance with the set photograph sensitivity.

The disclosed signal processing method further includes the step of amplifying analog image pick-up signals output from the image pick-up device with a predetermined gain (the amplification step), wherein: the strength of the noise reduction processing is set to be large as the predetermined gain becomes large; and the level difference correction step changes the correction strength in accordance with the predetermined gain.

The disclosed signal processing method further includes the step of: amplifying analog image pick-up signals output from the image pick-up device with a predetermined gain (the amplification step); and detecting a noise level of a black level signal included in the image pick-up signals (the detection step), wherein: the noise level of the black level signal increases as photograph sensitivity set in an image pick-up apparatus or the predetermined gain increases; the strength of the noise reduction processing is set to be large as the set photograph sensitivity or the predetermined gain becomes large; and the level difference correction step changes the correction strength in accordance with the noise level of the black level signal.

In the disclosed image processing method, the level difference correction step changes the correction strength by changing a correction coefficient by which at least one of the first and second image pick-up signals is multiplied.

In the disclosed signal processing method, the level difference correction step sets the correction coefficient to be small as the strength of the noise reduction processing becomes large.

The disclosed image processing method further includes the steps of: converting analog image pick-up signals output from the image pick-up device into digital signals (the AD conversion step); and subtracting an offset component at AD conversion executed by the AD conversion step from the image pick-up signals after the noise reduction processing (the offset subtraction step), wherein the level difference correction step applies correction for reducing the level difference to the image pick-up signals after subtraction of the offset component.

As described with reference to the exemplary embodiment, there is provided an image pick-up apparatus and a signal processing method which can accurately correct a signal level difference between pixels of the same color caused by optical characteristic.

What is claimed is:

1. An image pick-up apparatus comprising:
an image pick-up device that includes at least three kinds of color filters and photoelectric conversion elements formed under the color filters respectively;
a noise reduction processing portion that applies noise reduction processing to image pick-up signals output from the image pick-up device; and
a level difference correction portion that executes correction to reduce a level difference between first and second ones of the noise reduction-processed image pick-up signals obtained from the photoelectric conversion elements formed under two color filters which are of the same kind but different in arrangement pattern of color filters arranged around the two color filters,
wherein the level difference correction portion changes correction strength in accordance with strength of noise reduction processing executed by the noise reduction processing portion.

2. The image pick-up apparatus according to claim 1, wherein the noise reduction processing portion sets the strength of noise reduction processing to be large as photograph sensitivity in the image pick-up apparatus becomes large, and
the level difference correction portion changes the correction strength in accordance with the photograph sensitivity.

3. The image pick-up apparatus according to claim 1 further comprising an amplification portion that amplifies analog image pick-up signals output from the image pick-up device with a predetermined gain and output the amplified signal to the noise reduction portion,
wherein the noise reduction processing portion sets the strength of noise reduction processing to be large as the predetermined gain becomes large, and
the level difference correction portion changes the correction strength in accordance with the predetermined gain.

4. The image pick-up apparatus according to claim 1 further comprising:
an amplification portion that amplifies analog image pick-up signals output from the image pick-up device with a predetermined gain and output the amplified signal to the noise reduction portion; and
a detection portion that detects a noise level of a black level signal included in the image pick-up signals, wherein the noise reduction processing portion sets the strength of noise reduction processing to be large as photograph sensitivity in the image pick-up apparatus or the predetermined gain becomes large,
wherein the noise level of the black level signal increases as the photograph sensitivity in the image pick-up apparatus or the predetermined gain increases, and
the level difference correction portion changes the correction strength in accordance with the noise level of the black level signal.

5. The image pick-up apparatus according to claim 1 further comprising a storage portion that stores parameters for determining the correction strength in accordance with the strength of the noise reduction processing,
wherein the level difference correction portion reads the parameters corresponding to the set strength of the noise reduction processing from the storage portion and executes correction in accordance with the parameters.

6. The image pick-up apparatus according to claim 1 further comprising a storage portion that stores a function using the strength of the noise reduction processing as a variable to calculate parameters for determining the correction strength,
wherein the level difference correction portion executes correction in accordance with the parameters calculated based on the set strength of the noise reduction processing and the function.

7. The image pick-up apparatus according to claim 2 further comprising a storage portion which stores parameters for determining the correction strength in accordance with the photograph sensitivity,
wherein the level difference correction portion reads the parameters corresponding to the set photograph sensitivity from the storage portion and executes correction in accordance with the parameters.

8. The image pick-up apparatus according to claim 2 further comprising a storage portion which stores a function using the set photograph sensitivity as a variable to calculate parameters for determining the correction strength,
wherein the level difference correction portion executes correction in accordance with the parameters calculated based on the set photograph sensitivity and the function.

9. The image pick-up apparatus according to claim 3 further comprising a storage portion which stores parameters for determining the correction strength in accordance with the predetermined gain,
wherein the level difference correction portion reads the parameters corresponding to the predetermined gain from the storage portion and executes correction in accordance with the parameters.

10. The image pick-up apparatus according to claim 3 further comprising a storage portion which stores a function using the predetermined gain as a variable to calculate parameters for determining the correction strength,
wherein the level difference correction portion executes correction in accordance with the parameters calculated based on the predetermined gain and the function.

11. The image pick-up apparatus according to claim 4 further comprising a storage portion which stores parameters for determining the correction strength in accordance with the noise level of the black level signal,
wherein the level difference correction portion reads the parameters corresponding to the noise level of the black level signal from the storage portion and executes correction in accordance with the parameters.

12. The image pick-up apparatus according to claim 4, further comprising a storage portion which stores a function using the noise level of the black level signal as a variable to calculate parameters for determining the correction strength,
wherein the level difference correction portion executes correction in accordance with the parameters calculated based on the noise level of the black level signal and the function.

13. The image pick-up apparatus according to claim 1, wherein the level difference correction portion changes the correction strength by changing a correction coefficient by which at least one of the first and second image pick-up signals is multiplied.

14. The image pick-up apparatus according to claim 13, wherein the level difference correction portion sets the correction coefficient to be small as the strength of noise reduction processing becomes large.

15. The image pick-up apparatus according to claim 1 further comprising:
   an AD conversion portion which converts analog image pick-up signals output from the image pick-up device into digital signals; and
   an offset subtraction portion which subtracts an offset component at AD conversion executed by the AD conversion portion from the image pick-up signals after the noise reduction processing,
   wherein the level difference correction portion applies correction for reducing the level difference to the image pick-up signals after subtraction of the offset component.

16. A signal processing method comprising:
   applying noise reduction processing to image pick-up signals output from an image pick-up device including at least three kinds of color filters and photoelectric conversion elements formed under the color filters respectively; and
   reducing a level difference between first and second ones of the noise reduction-processed image pick-up signals obtained from the photoelectric conversion elements formed under two color filters of the same kind but different in arrangement pattern of color filters arranged around the two color filters,
   wherein correction strength in the reducing step is changed in accordance with strength of the noise reduction processing.

17. The signal processing method according to claim 16, wherein the strength of the noise reduction processing is set to be large as photograph sensitivity in an image pick-up apparatus becomes large, and
   the correction strength is changed in accordance with the photograph sensitivity in the reducing step.

18. The signal processing method according to claim 16, further comprising:
   amplifying analog image pick-up signals output from the image pick-up device with a predetermined gain,
   wherein the strength of the noise reduction processing is set to be large as the predetermined gain becomes large, and
   the correction strength is changed in accordance with the predetermined gain in the reducing step.

19. The signal processing method according to claim 16, further comprising:
   amplifying analog image pick-up signals output from the image pick-up device with a predetermined gain; and
   detecting a noise level of a black level signal included in the image pick-up signals,
   wherein the noise level of the black level signal increases as photograph sensitivity set in an image pick-up apparatus or the predetermined gain increases,
   the strength of the noise reduction processing is set to be large as the set photograph sensitivity or the predetermined gain becomes large, and
   the correction strength is changed in accordance with the noise level of the black level signal in the correction step.

20. The image processing method according to claim 16, wherein the correction strength is changed by changing a correction coefficient by which at least one of the first and second image pick-up signals is multiplied in the correction step.

21. The signal processing method according to claim 20, wherein the correction coefficient is set to be small as the strength of the noise reduction processing becomes large in the correction step.

22. The image processing method according to claim 16 further comprising:
   converting analog image pick-up signals output from the image pick-up device into digital signals; and
   subtracting an offset component at AD conversion executed by the converting step from the image pick-up signals after the noise reduction processing,
   wherein correction for reducing the level difference to the image pick-up signals after subtraction of the offset component is executed in the correction step.

* * * * *